United States Patent [19]

Kleiner et al.

[11] 4,289,794

[45] Sep. 15, 1981

[54] PROCESS OF PREPARING GASIFIED CANDY

[75] Inventors: Fredric Kleiner, New City; Pradip K. Roy, Yorktown; Michael J. Kuchman, Hopewell Junction, all of N.Y.

[73] Assignee: General Foods Corporation, White Plains, N.Y.

[21] Appl. No.: 129,513

[22] Filed: Mar. 12, 1980

[51] Int. Cl.³ ............................................. A23G 9/00
[52] U.S. Cl. ................................. 426/660; 426/474
[58] Field of Search ................... 426/660, 572, 474

[56] References Cited

U.S. PATENT DOCUMENTS

| | | | |
|---|---|---|---|
| 3,012,893 | 12/1961 | Kremzner | 426/660 |
| 3,985,909 | 10/1976 | Mitchell | 426/660 |
| 3,985,910 | 10/1976 | Kirkpatrick | 426/660 |
| 4,001,457 | 1/1977 | Hegadorn | 426/660 |

*Primary Examiner*—Jeanette M. Hunter
*Attorney, Agent, or Firm*—Daniel J. Donovan; Bruno P. Struzzi

[57] ABSTRACT

Gasified candy which produces a more pronounced popping sensation is prepared by maintaining a sugar melt at a temperature of below about 280° F. during gasification. This product contains observable gas bubbles with a majority of the large bubbles having a diameter greater than about 225μ which is substantially larger than those in the gasified candy produced heretofore.

8 Claims, 3 Drawing Figures

PROCESS OF PREPARING GASIFIED CANDY

BACKGROUND OF THE INVENTION

1. Field of the Invention

This invention relates to a method of preparing a confection. More particularly, it relates to a method of preparing gasified candy. This invention especially relates to an improved method of preparing gasified candy which produces a more pronounced popping sensation when eaten.

2. Description of the Prior Art

Gasified candy is hard candy containing gas, such as carbon dioxide, as disclosed in U.S. Pat. Nos. 3,012,893 of Kremzner and Mitchell, 3,985,909 and 3,985,910 of Kirkpatrick and 4,001,457 of Hegadorn which are incorporated herein by reference. Such a candy is made by a process which comprises melting crystalline sugar, contacting such sugar with gas at a pressure of 50 to 1,000 psig for a time sufficient to permit incorporation in said sugar of 0.5 to 15 cm$^3$ of gas per gram of sugar, maintaining the temperature of said sugar during said absorption above the solidification temperature of the melted sugar, and cooling said sugar under pressure to produce a solid amorphous sugar containing the gas. Upon the release of the pressure, the solid gasified candy fractures into granules of assorted sizes.

The resultant product contains 1% to 4% water and most typically 2% to 3% water by weight of the total composition. (All figures expressed herein as a percentage are in terms of weight percent, unless specifically expressed to the contrary.) Lower levels of moisture are not practicably obtainable because the additional heat necessary to drive off the water causes the candy melt to caramelize or burn, resulting in an off-flavor, undesirable product. High moisture levels result in a soft, sticky matrix which rapidly liberates the entrapped gas and is thus not storage stable.

The gasified candy, when placed in the mouth, produces an entertaining but short-lived popping sensation. As the candy is wetted in the mouth the candy melts and the gas escapes. The tingling effect in the mouth is sensational but short.

When the solidified gasified candy is fractured by the release of pressure from the preparation vessel, the resultant granulated pieces are irregular, randomed-sized pieces having the appearance of pieces of broken glass or what might be termed sharp-faced pieces of gravel. The granulated pieces are sieved to provide the gasified candy in a range of particle sizes.

This present invention is an improvement over the processes disclosed in the four patents referred to above. U.S. Pat. No. 3,012,893 discloses a process wherein the sugar is maintained above its fusion temperature of 25°–200° C. (77°–392° F.) while the gas, at a pressure of 50–1000 psig, is contacted with the sugar melt for 2 to 6 minutes. In the examples which illustrate this process, mixtures of sugar are held at 150° or 160° C. (302° or 320° F.) while carbon dioxide at 600 psig is mixed into the liquid sugar for a short period of time, usually about six minutes. U.S. Pat. No. 3,985,909 does not specify the operating parameters of the process employed but U.S. Pat. Nos. 3,985,910 and 4,001,457 both exemplify the process utilizing a sugar melt maintained at 315°–325° F. while carbon dioxide at 600 psig is brought into contact with the sugar.

In producing gasified candy by a commercial process conducted in accordance with the disclosures of these patents, gasified candy is produced from a mixture of sucrose, lactose and corn starch dissolved in water and evaporated to a sugar melt containing about 2 to 3% water. Carbon dioxide is maintained at 625 to 675 psig in the pressure vessel containing the sugar melt while the vessel contents are mixed for 4 to 6 minutes. The sugar melt is held at about 295° F. during the gasification. Following the gasification, the gasified melt is transferred to a water-jacketed cooling tube where it is held for 2½–3 hours at a pressure which is 50 psi higher than the gasification pressure. At the end of the cooling cycle, the pressure is released from the cooling tube which causes the solidified gasified candy to shatter into multiple fragments. Analysis of an acceptable product produced by the described process shows that it contains observable gas bubbles having a diameter ranging from 5 to 225$\mu$.

As used herein "observable gas bubbles" means those gas bubbles which can be seen when the solidified gasified candy is observed through light microscopy. The observable bubbles are generally classified into large bubbles, i.e., those having a diameter of about 100$\mu$ and above and small bubbles, i.e., those having a diameter below about 100$\mu$. The small bubbles are generally not considered to be significant since they do not contribute to the popping sensation.

A testing panel, specifically trained to determine the organoleptic quality of the gasified candy when eaten, has established a numerical scale to provide a quantitative evaluation of popping sensation produced by the commercial product. The numerical scale ranges from 0 to 14 with 0 representing no popping sensation and 14 representing the maximum popping sensation ever observed. This rating, term a "Pop" rating, is used to reject or accept batches of the commercial product. Gasified candy with a "Pop" rating of below 7 is generally rejected for producing an inadequate or inferior popping sensation. Products with a 7-9 "Pop" rating are generally acceptable since they produce a satisfactory popping effect while a gasified candy displaying a rating of 10-12 is considered outstanding since it produces a very pronounced popping sensation.

The object of this invention is to provide a gasified candy having a more pronounced popping sensation than that of the product produced commercially heretofore.

It is another object of this invention to reduce the number of unacceptable batches of gasified candy prepared commercially heretofore.

SUMMARY OF THE INVENTION

In accordance with the present invention, it has been found that gasified candy which produces a more pronounced popping sensation can be prepared by utilizing preparation temperatures significantly lower than those employed heretofore. The gasified candy product obtained by this improved process contains observable gas bubbles having a maximum diameter substantially larger than those in the commercial product produced heretofore. For example, the commercial product has a majority of observable large gas bubbles with a diameter in the range of about 150 to about 225$\mu$ whereas the product of this invention has a majority of large gas bubbles with a diameter above about 225$\mu$ and more particularly in the range of about 300 to about 350$\mu$.

This invention is directed to a process of preparing gasified candy whereby a sugar melt is gasified at superatmospheric pressure and the gasified sugar melt is cooled below its fusion temperature under superatmospheric pressure to form a gasified candy and, in particular, this invention is directed to the improvement in said process which comprises:

maintaining the sugar melt during the gasification at a temperature effective to produce in the gasified candy product observable gas bubbles wherein the majority of the large observable gas bubbles have a diameter of above about 225μ.

This invention is also directed to the product prepared by this improved process.

This invention is additionally directed to a gasified candy comprising a solidified fused sugar containing therewithin bubbles of gas, said gas being at superatmospheric pressure and said observable bubbles having a maximum diameter of about 350μ.

BRIEF DESCRIPTION OF THE DRAWING

The present invention will be more readily understood by reference to the accompanying drawings.

DESCRIPTION OF THE PREFERRED EMBODIMENTS

Figure 1:
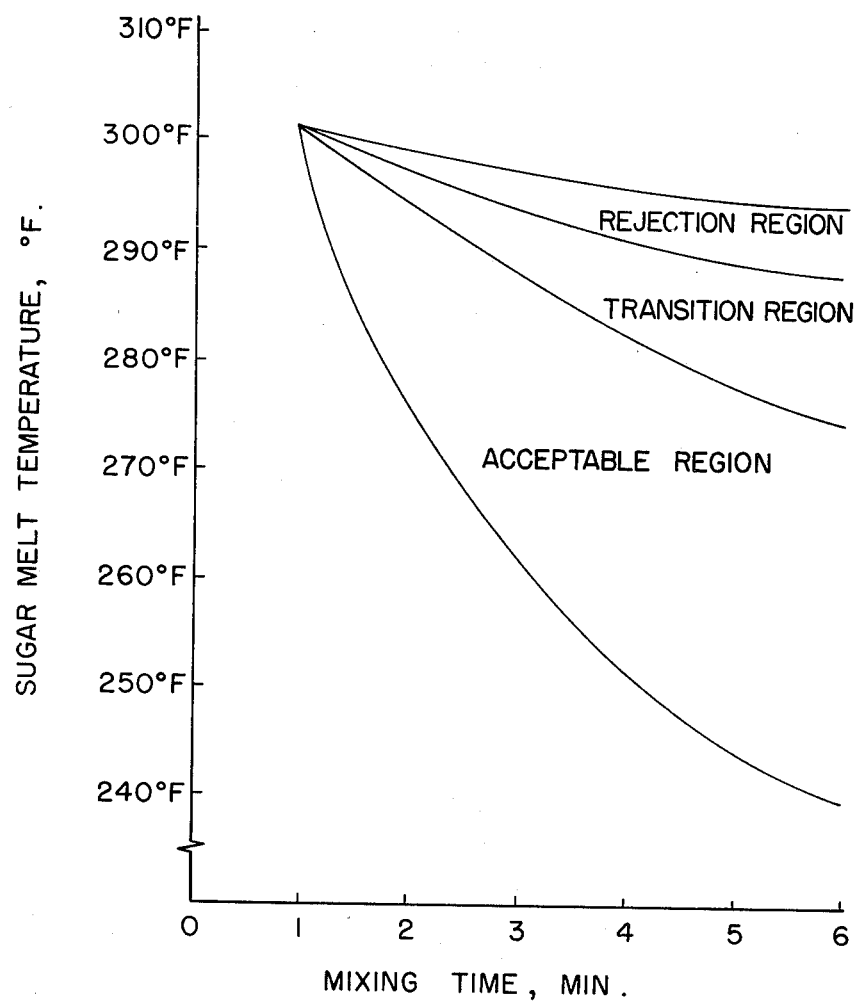
FIG. 1 is a graph showing the relationship of sugar melt temperature and mixing time on the quality of the gasified candy product.

The present invention relates to improvements in the method of preparing gasified candy. It specifically relates to maintaining the sugar melt at a lower temperature during the gasification step than has been employed commercially heretofore. This lower temperature results in a commercial product having larger gas bubbles than the present product. These larger bubbles give higher "Pop" ratings because they break with greater force and emit a louder sound.

Gasified candy is often sold as a novelty product and in recent years this product has become particularly popular with the younger members of the public. Today's youth seem to prefer a gasified candy which produces a very pronounced pop. Since the product of the present invention exhibits a higher "pop" rating than the commercial product produced heretofore, it is expected that it will prove even more popular with today's young people than the gasified candy currently available.

The gasified candy component of the instant confection is a hard sugar product having bubbles of gas entrapped therein and is conveniently produced according to the present invention which is an improvement of the processes disclosed in U.S. Pat. Nos. 3,012,893, 3,985,909, 3,985,910 and 4,001,457 and discussed hereinbefore. The gasified candy can be prepared from any of the commercially-available sugars employed in the confectionary industry. Thus, such sugars as glucose, fructose, sucrose, lactose and the like, alone or in combination, may be employed in practicing the instant invention. A mixture of sucrose with corn syrup (containing glucose, maltose, dextrin) is also satisfactory. A mixture of sucrose, lactose and corn syrup in a weight ratio of 52:27:21 is particularly preferred, providing an excellent gasified hard product particularly characterized by its good gas retention and reduced stickiness on standing. A 40:40:20 mixture of sucrose, lactose and corn syrup is especially preferred since it additionally provides good high temperature stability. The moisture content of the gasified candy is typically between 1.0 and 5.0%. Preferably, it is between 2.0 and 3.0%.

The gases used to prepare the gasified candy of the present invention may be any of the commonly-available gases which are substantially unreactive with the sugar or sugars being employed and include such gases as carbon dioxide, nitrogen or air, but carbon dioxide is preferred. The gasified candy contains 0.5 to 15, preferably 2 to 7, $cm^3$ of gas per gram of candy.

Coloring, flavoring and/or active ingredients may be incorporated in the gasified candy to enhance the eye appeal of the confection and to provide a pleasing taste to complement the popping effect of the gasified candy. Commercial colorings are available in a variety of hues for incorporation into foodstuffs and may be employed in this invention. The choice will be dependent on the desired effect and possibly the flavoring, if any, to be incorporated into the confection. Flavors such as wintergreen, spearmint, peppermint, birch, anise and such fruit flavors, as cherry, lemon-lime, orange, grape, etc. and mixtures thereof and the like may be used satisfactorily with the confection of the present invention and are available commercially. Active ingredients are also available for incorporation in the confection to provide a product useful as a breath freshener. The amount of coloring, flavoring and/or active ingredient used will vary depending on the type used, individual taste preferences, the specific gasified candy employed and other considerations well known to those skilled in the confectionary art. Preferably, these ingredients are added to the sugary melt after the desired moisture level is obtained by evaporation of the melt, under vacuum.

The gasified candy is employed in granulated form and is most easily provided in that form following the solidification of the gasified sugar in the preparation vessel or in a separate cooling tube provided for this purpose. The release of pressure from the vessel fractures the gasified sugar into granulated pieces in a wide range of assorted sizes. Although finely divided pieces of gasified candy in a variety of sizes may be employed in the invention, it is preferred that the pieces be sieved to provide uniform sized pieces. In general, smaller sized pieces are preferred. Gasified candy having a particle size distribution of −4 to +40 U.S. Sieve Series can be employed, but −4 to +14 U.S. Sieve Series are preferred.

A sugarless form of gasified candy can also be employed in this invention by substituting sugarless material, such as sorbitol, for the sugar in the gasified candy preparation described herein.

The gasified candy may be prepared in accordance with the present invention as follows:

The sugar or mixtures of sugars are placed in a heated vessel provided with a mixer. A small quantity of water is added to dissolve the sugar and other additives. Heat is applied to the vessel sufficient to dissolve the sugars. The mixture is then evaporated to produce a melt having 1–5%, preferably 2–3%, of water. The required amounts of coloring, flavoring and/or active ingredient are usually added when the desired water content is achieved. The evaporation may be conducted at atmospheric pressure or, preferably, under a vacuum of up to 15 inches of mercury. Melt temperatures of between about 280°–320° F. are usually necessary to reach the desired moisture content. Care must be exercised, of course, to prevent caramelizing the sugary mix.

The next step is to gasify the sugar melt and it is in this particular step that the temperature of the sugar melt is critical when practicing the improved process of the subject invention. It has been found that the temperature at which the melt is maintained while the gas is being incorporated therein affects the "Pop" rating of the product, i.e., the quality of the popping sensation produced by the gasified candy. Lower melt temperatures promote larger gas bubbles because both the viscosity and the surface tension of the melt is increased as the temperature is reduced and bubble diameter is proportional to both viscosity and surface tension. Melt temperatures which produce observable gas bubbles having a maximum diameter of about 350μ have been found to be quite satisfactory. Maximum melt temperatures of about 280° F. usually achieve this desired result and produce a product with a "Pop" rating in the 10–12 range. The larger the gas bubbles entrapped in the solidified candy, the more pronounced the popping when the candy is eaten. Observable bubbles having a maximum diameter of about 350μ are produced when the melt temperature during gasification is below about 280° F. and the mixing time is about 4–6 minutes. This bubble diameter appears to be a practical maximum when balancing the desired end result with the process variable limitation.

The sugar melt is gasified by introducing gas, preferably carbon dioxide, at superatmospheric temperature into the closed vessel. Pressures of about 50–1000 psig, preferably about 500–700 psig, are utilized. While the required amount of gas is being introduced into the closed vessel, the liquid melt is agitated to effect intimate contact between the gas and the melt. Sufficient gas is incorporated into the melt to provide 0.25–7.0 cc. of gas per gram of candy in the final product. The gasification is completed within a fairly short period of time. Usually less than about 10 minutes, normally 2 to 6 minutes, are sufficient. During this time, the melt is maintained at a maximum temperature as explained above. The required amount of mixing may be readily determined by those skilled in the art. For example, using a Parr bomb (a small pressure vessel equipped with a mixer) to prepare about 1,000 grams of melt, mixing speeds of 200–1500 rpm, preferably 500–900 rpm, have been found to be satisfactory.

The gasified melt is then permitted to solidify while maintaining the vessel under pressure. Where desired, the solidification may be conducted in a cooling tube as described in U.S. Pat. Nos. 3,985,910 and 4,001,457. Bubbles of gas are entrapped in the solidified sugar. After the melt has solidified, the pressure is released, which fractures the sugary mass into granulated pieces of a variety of sizes.

The following example illustrates the invention:

1000 grams of sucrose, lactose and corn syrup in a weight ration of 52:27:21 were dissolved in water and evaporated at a temperature of 320° F. atmospherically to produce a melt having a moisture content of about 3%. This melt was placed in a pre-heated Parr bomb (a small pressure vessel equipped with a mixer). The bomb was placed in a controlled temperature bath and pressurized with $CO_2$ at 750 psig for five minutes during which time the sugar melt was mixed vigorously. Following the carbonation, the pressure was maintained while the vessel was cooled so as to solidify the sugar melt. Rapidly releasing the pressure fractured the solidified carbonated candy into multiple pieces of various sizes.

A number of batches of carbonated candy were prepared in accordance with the above procedure. A variety of melt temperatures was evaluated for mixing times which ranged from about 4 to about 6 minutes. The product from each batch was evaluated by a testing panel to obtain a "Pop" rating. The batches were accepted or rejected on this numerical rating scale which is described hereinabove. It was found that the data provided the graph of FIG. 1 showing a "rejection" region which shows conditions where the product had a "Pop" rating below 7, a "transition" region where the "Pop" rating of the product sometimes was below 7 and sometimes was 7 and above and an "acceptable" region where the gasified candy product always had a "Pop" rating of 7 and above and in some instances had a very high "Pop" rating of 10–12. These data and FIG. 1 prepared therefrom show that by maintaining a melt temperature of below about 280° F. during gasification and by proper selection of mixing time, gasified candy of an "acceptable" quality can be produced. In this fashion, the number of batches which have been rejected in the commercial production of gasified candy can be reduced significantly.

Figure 2:
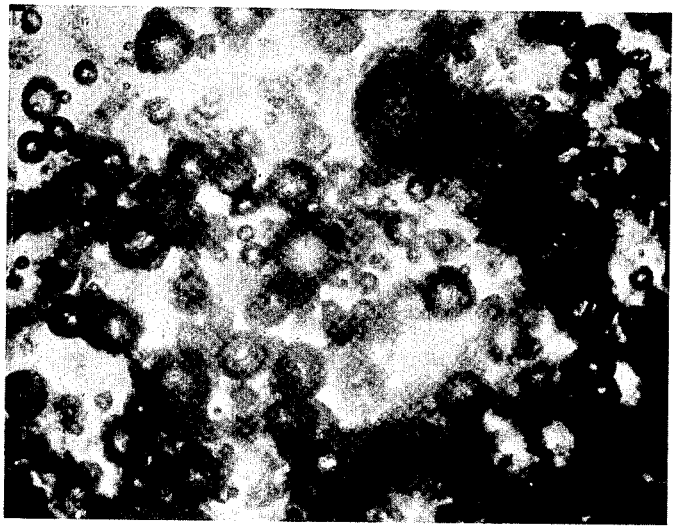
FIG. 2 is a photomicrograph of a gasified candy product prepared at a sugar melt temperature of 295° F.
Figure 3:
FIG. 3 is a photomicrograph of a gasified candy product prepared at a sugar melt temperature of 280° F.

Two particular runs are typical of those described above. In the first, the sugar melt was maintained at 295° F. while it was mixed for the four minutes of carbonation. This product had a "Pop" rating of 3 and was unacceptable. FIG. 2 is a photomicrograph of this product taken at a magnification of 107.5:1. This shows that the majority of the observable "large" bubbles ("large" bubbles are those observable bubbles with a diameter of about 100μ and above) had diameters in the range of about 150 to about 225μ. The second run was similar to the first except that the melt temperature was 280° F. The gasified candy from the second run had a "Pop" rating of 9 and was acceptable. FIG. 3 is a photomicrograph of this product taken at a magnification of 107.0:1. This shows that the majority of the observable "large" bubbles had diameters in the range of about 300 to about 350μ.

What is claimed is:

1. In a process of preparing gasified candy whereby a sugar melt is gasified at superatmospheric pressure and the gasified sugar melt is cooled below its fusion temperature under superatmospheric pressure to form a gasified candy, the improvement which comprises:

maintaining the sugar melt during the gasification at a temperature below about 280° F. effective to produce in the gasified candy product observable gas bubbles wherein the majority of the observable gas bubbles have a diameter of above about 225μ, and wherein the gasifying gas is carbon dioxide, nitrogen or air.

2. A process according to claim 1 wherein the sugar melt comprises glucose, fructose, sucrose, lactose, corn syrup or mixtures thereof.

3. A process according to claim 1 wherein the sugar melt comprises sucrose, lactose and corn syrup.

4. A process according to claim 1 wherein the gasifying gas is carbon dioxide.

5. A process according to claims 1, 2, 3 or 4 wherein the sugar melt additionally contains coloring, flavoring or active ingredient.

6. A process according to claims 1, 2, 3 or 4 wherein the majority of the observable gas bubbles in the gasified candy product have a diameter in the range of about 225μ to about 350μ.

7. A process according to claims 1, 2, 3 or 4 wherein the majority of the observable gas bubbles in the gasified candy product have a diameter in the range of about 300μ to about 350μ.

8. A gasified candy prepared by the process of claim 1.